(12) United States Patent
Meyer et al.

(10) Patent No.: US 11,408,326 B2
(45) Date of Patent: Aug. 9, 2022

(54) INTERNAL COMBUSTION ENGINE WITH ELECTRIC STARTING SYSTEM

(71) Applicant: Briggs & Stratton, LLC, Wauwatosa, WI (US)

(72) Inventors: Mark Meyer, Wawatosa, WI (US); David W. Procknow, Elm Grove, WI (US); James Michael Busse, Kenosha, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 17/259,049

(22) PCT Filed: Jul. 12, 2018

(86) PCT No.: PCT/US2018/041756
§ 371 (c)(1),
(2) Date: Jan. 8, 2021

(87) PCT Pub. No.: WO2020/013825
PCT Pub. Date: Jan. 16, 2020

(65) Prior Publication Data
US 2021/0270225 A1 Sep. 2, 2021

(51) Int. Cl.
*F02N 11/08* (2006.01)
*F01P 5/02* (2006.01)
(Continued)

(52) U.S. Cl.
CPC .............. *F01P 5/02* (2013.01); *A01D 34/6818* (2013.01); *F01M 11/10* (2013.01); *F02M 35/048* (2013.01); *F02M 37/0076* (2013.01); *F02N 11/0862* (2013.01); *F02N 15/02* (2013.01); *F02N 2200/041* (2013.01); *F02N 2200/044* (2013.01); *F02N 2200/062* (2013.01);
(Continued)

(58) Field of Classification Search
None
See application file for complete search history.

(56) References Cited

U.S. PATENT DOCUMENTS

| 3,536,051 A | 10/1970 | Hamman |
| 4,887,476 A | 12/1989 | Yokoyama |

(Continued)

FOREIGN PATENT DOCUMENTS

| CN | 101275531 A | * 10/2008 | ........... F02D 41/064 |
| CN | 100510385 C | * 7/2009 | .......... F02N 11/0848 |

(Continued)

OTHER PUBLICATIONS

International Search Report and Written Opinion regarding PCT Appl. No. PCT/US2018/041756, dated Nov. 30, 2018, 9 pages.

*Primary Examiner* — Kevin R Steckbauer
(74) *Attorney, Agent, or Firm* — Foley & Lardner LLP

(57) ABSTRACT

An engine including an engine block having a cylinder defining a front of the engine, a blower housing coupled to the engine block and defining a hot half and a cool half opposite the front half, a starter mount assembly coupled to the blower housing and positioned within the cool half, an electric starter motor retained by the starter mount assembly, and a battery mounted to the blower housing and positioned in the cool half. The battery is electrically coupled to the electric starter motor.

6 Claims, 6 Drawing Sheets

(51) Int. Cl.
*A01D 34/68* (2006.01)
*F01M 11/10* (2006.01)
*F02M 35/04* (2006.01)
*F02M 37/00* (2006.01)
*F02N 15/02* (2006.01)
*F16D 41/12* (2006.01)
*F16H 1/16* (2006.01)

(52) U.S. Cl.
CPC .. *F02N 2300/102* (2013.01); *F02N 2300/108* (2013.01); *F16D 41/12* (2013.01); *F16H 1/16* (2013.01)

(56) References Cited

U.S. PATENT DOCUMENTS

| | | | | |
|---|---|---|---|---|
| 5,838,085 | A * | 11/1998 | Roesel, Jr. | H02K 16/00 310/112 |
| 5,990,590 | A * | 11/1999 | Roesel, Jr. | H02J 9/066 310/112 |
| 6,240,889 | B1 | 6/2001 | Kuwabara et al. | |
| 6,531,787 | B2 * | 3/2003 | Koelle | F02N 11/08 290/31 |
| 7,370,619 | B2 | 5/2008 | Berger | |
| 7,650,865 | B2 | 1/2010 | Kohls | |
| 8,258,639 | B2 * | 9/2012 | Labbe | F02N 11/087 290/38 A |
| 8,655,526 | B2 * | 2/2014 | Schwenke | B60W 20/40 701/22 |
| 8,878,481 | B2 * | 11/2014 | Connelly | F02N 11/0814 318/778 |
| 9,394,873 | B2 * | 7/2016 | Fujita | F02N 11/087 |
| 9,771,915 | B2 * | 9/2017 | Hirabayashi | F02N 15/046 |
| 10,539,112 | B2 * | 1/2020 | Meyer | F02N 11/14 |
| 10,544,772 | B2 * | 1/2020 | Hao | H02P 6/08 |
| 10,690,102 | B2 * | 6/2020 | Yoshida | F02N 11/08 |
| 11,085,412 | B2 * | 8/2021 | Procknow | F02N 15/006 |
| 2002/0163197 | A1 * | 11/2002 | Koelle | F02N 11/08 290/38 E |
| 2009/0267553 | A1 * | 10/2009 | Labbe | F02N 11/0851 310/158 |
| 2012/0119516 | A1 * | 5/2012 | Connelly | F02N 11/087 290/38 E |
| 2012/0179312 | A1 * | 7/2012 | Schwenke | B60W 10/08 180/65.265 |
| 2012/0209501 | A1 * | 8/2012 | Turnback | F02N 11/0814 701/113 |
| 2014/0076259 | A1 * | 3/2014 | Fujita | H02P 9/08 123/185.1 |
| 2015/0354523 | A1 * | 12/2015 | Hirabayashi | F02N 11/087 123/179.3 |
| 2017/0204829 | A1 | 7/2017 | Hannah et al. | |
| 2018/0175691 | A1 | 6/2018 | Koenen et al. | |
| 2018/0180012 | A1 * | 6/2018 | Yoshida | B60W 10/08 |
| 2019/0101092 | A1 * | 4/2019 | Meyer | F02B 63/02 |
| 2019/0323472 | A1 * | 10/2019 | Hao | F02N 11/0851 |
| 2020/0116117 | A1 * | 4/2020 | Procknow | F02N 15/023 |
| 2021/0270225 | A1 * | 9/2021 | Meyer | F02N 11/0862 |
| 2022/0042474 | A1 * | 2/2022 | Chen | F02D 41/30 |
| 2022/0042487 | A1 * | 2/2022 | Chen | F02P 5/1502 |

FOREIGN PATENT DOCUMENTS

| | | | | |
|---|---|---|---|---|
| CN | 102333946 | A * | 1/2012 | F02D 29/02 |
| CN | 102465812 | A * | 5/2012 | F02N 11/0814 |
| CN | 102481926 | A * | 5/2012 | B60K 6/26 |
| CN | 102483025 | A * | 5/2012 | F02N 11/0814 |
| CN | 103597200 | A * | 2/2014 | F02N 11/087 |
| CN | 102333946 | B * | 10/2014 | F02D 29/02 |
| CN | 105275703 | A * | 1/2016 | F02N 11/087 |
| CN | 102465812 | B * | 8/2016 | F02N 11/0814 |
| CN | 103597200 | B * | 8/2016 | F02N 11/087 |
| CN | 103958309 | B * | 8/2016 | B60K 6/547 |
| CN | 105275703 | B * | 6/2018 | F02N 11/087 |
| CN | 110397539 | A * | 11/2019 | F02N 11/08 |
| CN | 110397539 | B * | 4/2021 | F02N 11/08 |
| CN | 107630777 | B * | 8/2021 | B60K 6/387 |
| DE | 102006025439 | A1 * | 12/2006 | F01L 1/3442 |
| DE | 102009029207 | A1 * | 3/2011 | F02N 11/0814 |
| DE | 102011085625 | A1 * | 5/2012 | F02N 11/0814 |
| DE | 102012000036 | A1 * | 7/2012 | B60W 10/06 |
| DE | 102012000036 | B4 * | 10/2015 | B60W 10/06 |
| DE | 102015108249 | A1 * | 12/2015 | F02N 11/087 |
| DE | 102017116180 | A1 * | 1/2018 | B60K 6/387 |
| DE | 102019109803 | A1 * | 10/2019 | F02N 11/08 |
| EP | 0 364 118 | A1 | 4/1990 | |
| EP | 0 407 694 | | 1/1991 | |
| EP | 2110544 | A1 * | 10/2009 | F02N 11/0851 |
| EP | 2239455 | A1 * | 10/2010 | F02N 15/067 |
| EP | 2754883 | A1 * | 7/2014 | F02N 11/087 |
| EP | 2239455 | B1 * | 8/2015 | F02N 15/067 |
| EP | 3 085 948 | A1 | 10/2016 | |
| EP | 2288805 | B1 * | 5/2017 | F02N 11/0851 |
| FR | 2930001 | A1 * | 10/2009 | F02N 11/0851 |
| FR | 2930002 | A1 * | 10/2009 | F02N 11/0851 |
| FR | 2944067 | A1 * | 10/2010 | F02N 15/067 |
| FR | 2952130 | A1 * | 5/2011 | F02C 7/275 |
| GB | 2485375 | A * | 5/2012 | F02N 11/0814 |
| JP | 2002188548 | A * | 7/2002 | F02N 11/04 |
| JP | 2004028010 | A * | 1/2004 | F02N 11/04 |
| JP | 3942401 | B2 * | 7/2007 | F02N 11/0851 |
| JP | 4001331 | B2 * | 10/2007 | F02N 11/0848 |
| JP | 4004872 | B2 * | 11/2007 | F02N 11/04 |
| JP | 4188820 | B2 * | 12/2008 | F02N 15/025 |
| JP | 2015229944 | A * | 12/2015 | F02N 11/087 |
| JP | 2021161880 | A * | 10/2021 | B62J 1/02 |
| JP | 6978539 | B2 * | 12/2021 | B62J 1/02 |
| KR | 20060065050 | A * | 6/2006 | F02D 31/001 |
| WO | WO-9534117 | A1 * | 12/1995 | F02N 11/04 |
| WO | WO-0196735 | A1 * | 12/2001 | F02N 11/08 |
| WO | WO-2008156478 | A1 * | 12/2008 | F02N 11/10 |
| WO | WO-2009138624 | A2 * | 11/2009 | F02N 11/0851 |
| WO | WO-2011026672 | A1 * | 3/2011 | F02N 11/0814 |
| WO | WO-2013035168 | A1 * | 3/2013 | F02N 11/087 |
| WO | WO-2014/205247 | | 12/2014 | |
| WO | WO-2017/189912 | A1 | 11/2017 | |
| WO | WO-2017189912 | A1 * | 11/2017 | A01D 34/6818 |
| WO | WO-2020013825 | A1 * | 1/2020 | F01M 11/10 |

* cited by examiner

INTERNAL COMBUSTION ENGINE WITH ELECTRIC STARTING SYSTEM

BACKGROUND

The present invention generally relates to internal combustion engines and outdoor power equipment powered by such engines. More specifically, the present invention relates to an electric starting system for an engine.

Outdoor power equipment includes lawn mowers, riding tractors, snow throwers, pressure washers, portable generators, tillers, log splitters, zero-turn radius mowers, walk-behind mowers, riding mowers, industrial vehicles such as forklifts, utility vehicles, etc. Outdoor power equipment may, for example use an internal combustion engine to drive an implement, such as a rotary blade of a lawn mower, a pump of a pressure washer, the auger of a snow thrower, the alternator of a generator, and/or a drivetrain of the outdoor power equipment.

Many pieces of outdoor power equipment include engines that are manually started with a recoil starter. To start the engine, the user must manually pull a recoil starter rope. Other pieces of outdoor power equipment include electric starting systems in which a starter motor powered by a battery starts the engine. Conventional electric starting systems typically require an engine block different than the engine block used with a recoil starting system. The electric start engine block adds a mounting location that the starter motor is secured to. Conventional electric starting systems also require a flywheel with a ring gear that is engaged with the starter motor pinion gear.

SUMMARY

One embodiment relates to an engine that includes an engine block having a cylinder defining a front of the engine, a blower housing coupled to the engine block and defining a hot half and a cool half opposite the front half, a starter mount assembly coupled to the blower housing and positioned within the cool half, an electric starter motor retained by the starter mount assembly, and a battery mounted to the blower housing and positioned in the cool half. The battery is electrically coupled to the electric starter motor.

Another embodiment relates to an engine that includes an engine block, a blower housing coupled to the engine block, the blower housing including an exterior wall that defines an interior cavity, an electric starter motor positioned within the interior cavity and secured to the blower housing, and a battery positioned within the interior cavity and integrated into the blower housing.

Another embodiment relates to an engine that includes a controller structured to control a flow of power from a battery mounted in a blower housing of the engine to an electric starter motor mounted to the blower housing to cause the electric starter motor to rotate at a first speed, sense a current draw of the electric starter motor, continue operation of the electric starter motor at the first speed while the current draw is below a threshold value, determine that the current draw has exceeded the threshold value, and increase the speed of the electric starter motor to a second speed greater than the first speed in response to determining that the current draw has exceeded the threshold value.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the drawings, a starter assembly for an engine is shown and described that includes a blower housing and a starter motor and a battery mounted to the blower housing. The starter motor is mounted in an area of the blower housing located away from any hot components of the engine such as a muffler/exhaust or a cylinder. The battery is integrated into or mounted on the blower housing for removal therewith. The starter motor is also arranged to use time thresholds and/or current sensing to provide a soft start feature.

Figure 1:
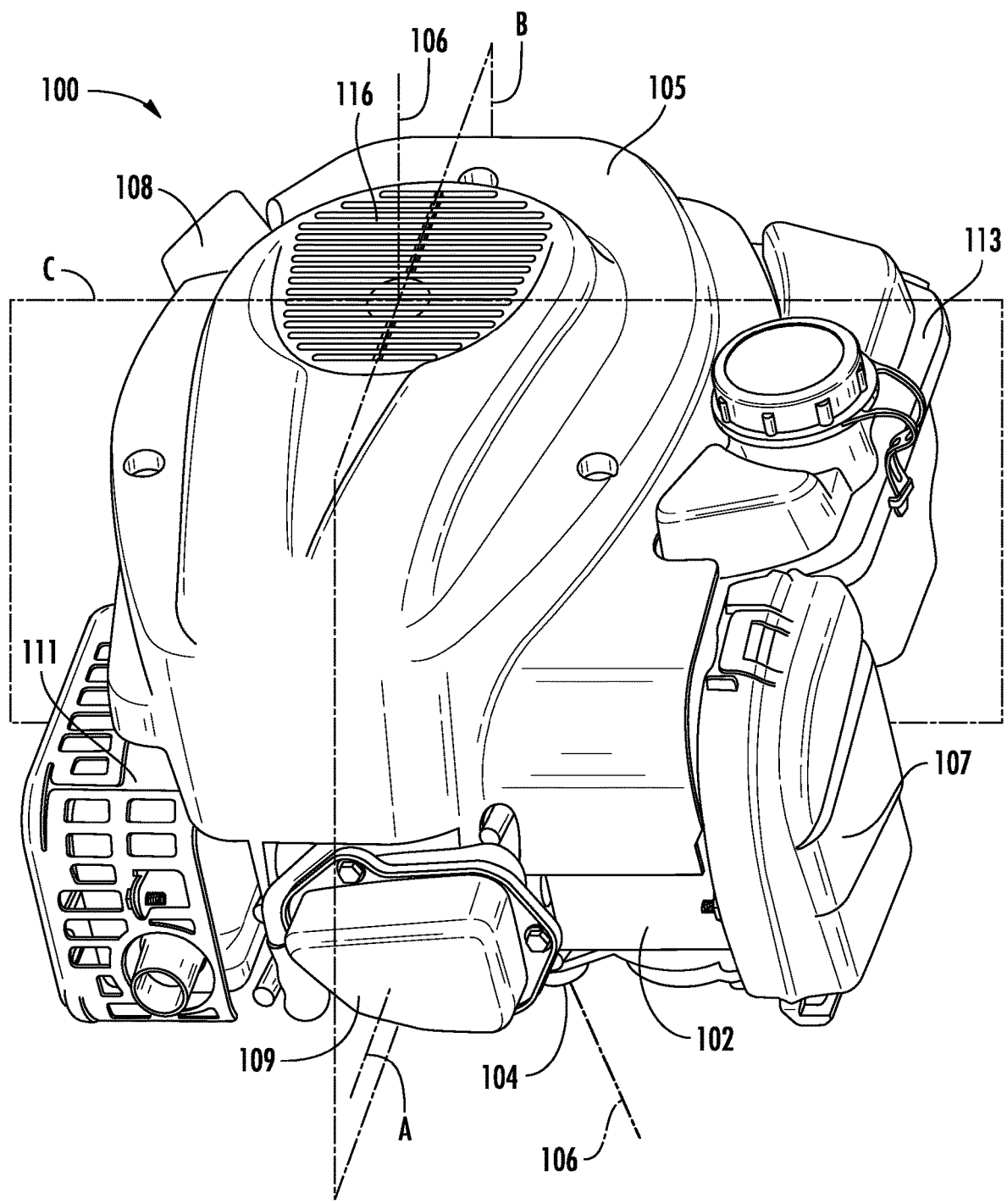
FIG. 1 is a perspective view of an internal combustion engine including an electric starting system, according to an exemplary embodiment.
Figure 2:
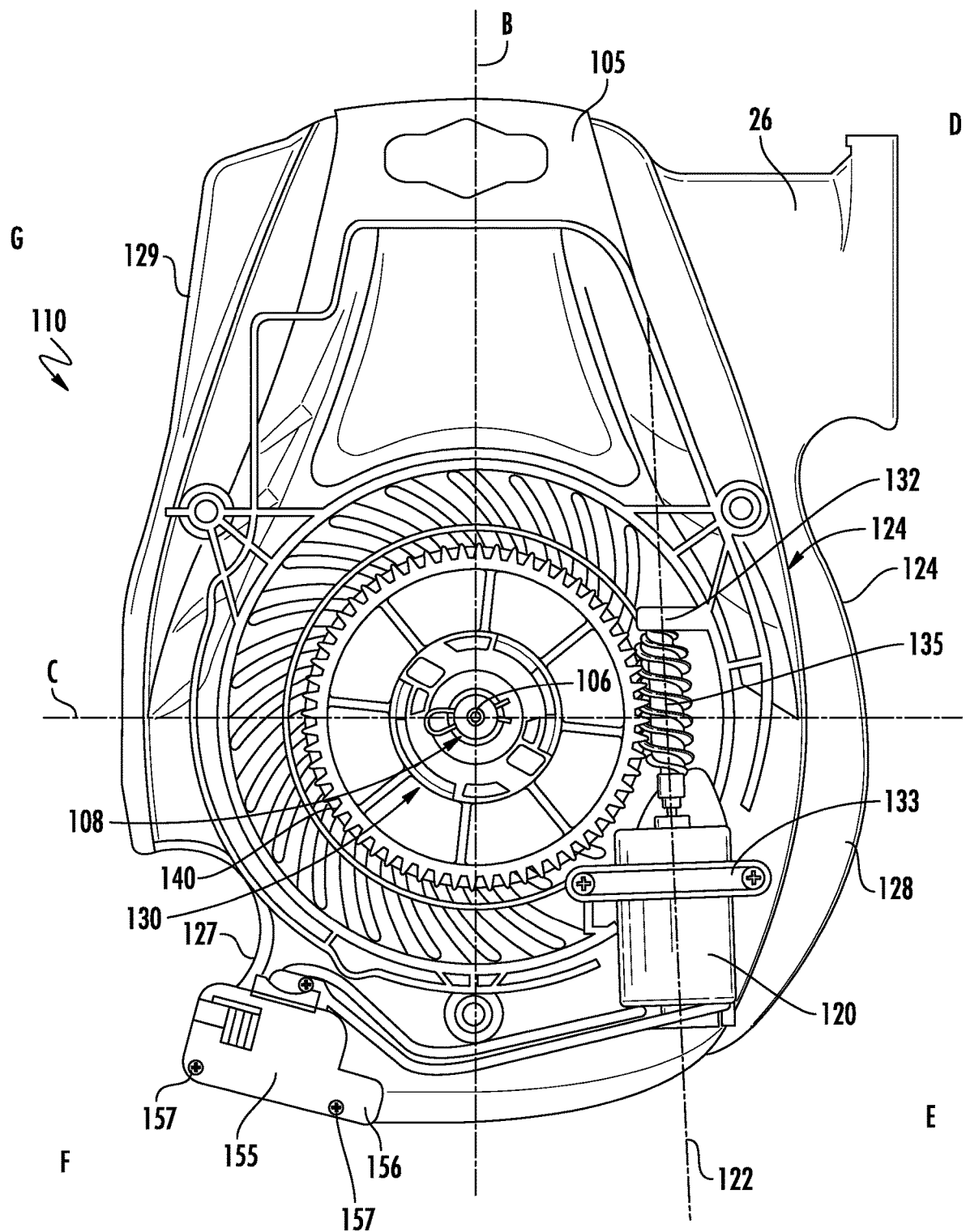
FIG. 2 is a bottom view of a blower housing and other components of the engine of FIG. 1.
Figure 3:
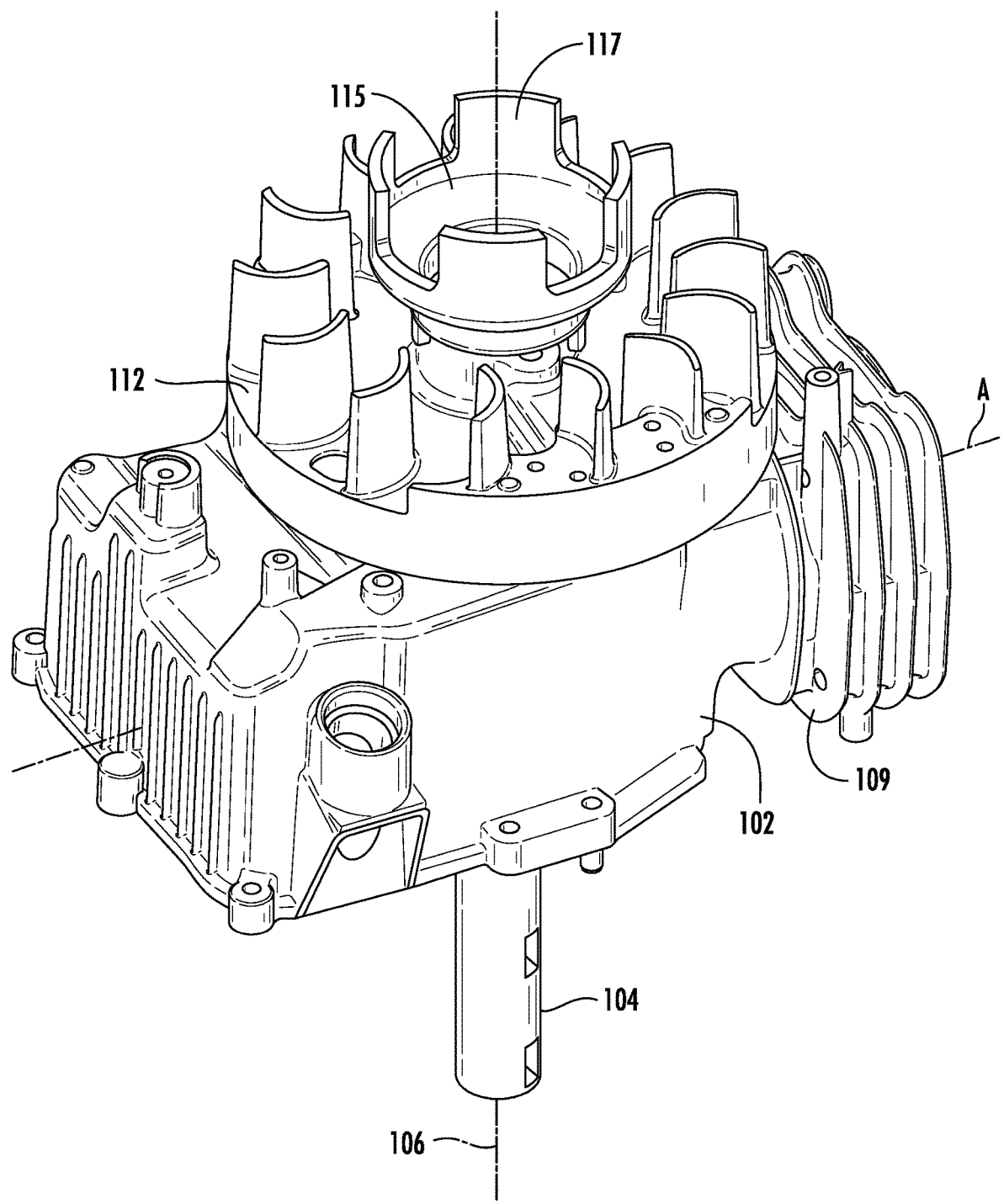
FIG. 3 is a perspective view of a portion of the engine of FIG. 1, according to an exemplary embodiment.

Referring to FIGS. 1-3, an internal combustion engine 100 including an electric starting system 110 (see FIG. 2) is shown according to an exemplary embodiment. The internal combustion engine 100 includes an engine block 102 having a cylinder, a piston, and a crankshaft 104. The piston reciprocates in the cylinder to drive the crankshaft 104. The crankshaft 104 rotates about a crankshaft axis 106. A flywheel 112 (see FIG. 3) is attached to the crankshaft 104. The engine 100 also includes a fuel system for supplying an air-fuel mixture to the cylinder (e.g., a carburetor, an electronic fuel injection system, a direct fuel injection system, etc.), an air filter assembly 107, an oil dipstick assembly 108, a cylinder head 109 (see FIG. 3), a muffler 111, and a fuel tank 113. The engine 100 also includes a blower housing 105 (cowl, cover) configured to direct cooling air over the engine block 102 and other components of the engine 100 during operation. A fan (e.g., a fan driven by the crankshaft 104, an electric fan, etc.) draws cooling air from the ambient environment into the blower housing 105 through one or more air inlets 116. The fan may be a component of or coupled to the flywheel 112. In the illustrated embodiment, the crankshaft 104 and the crankshaft axis 106 are oriented vertically. In some embodiments, the crankshaft 104 and the crankshaft axis 106 are oriented horizontally. In some embodiments, the engine includes multiple cylinders, for example, a two cylinder engine arranged in a V-twin configuration.

Figure 4:
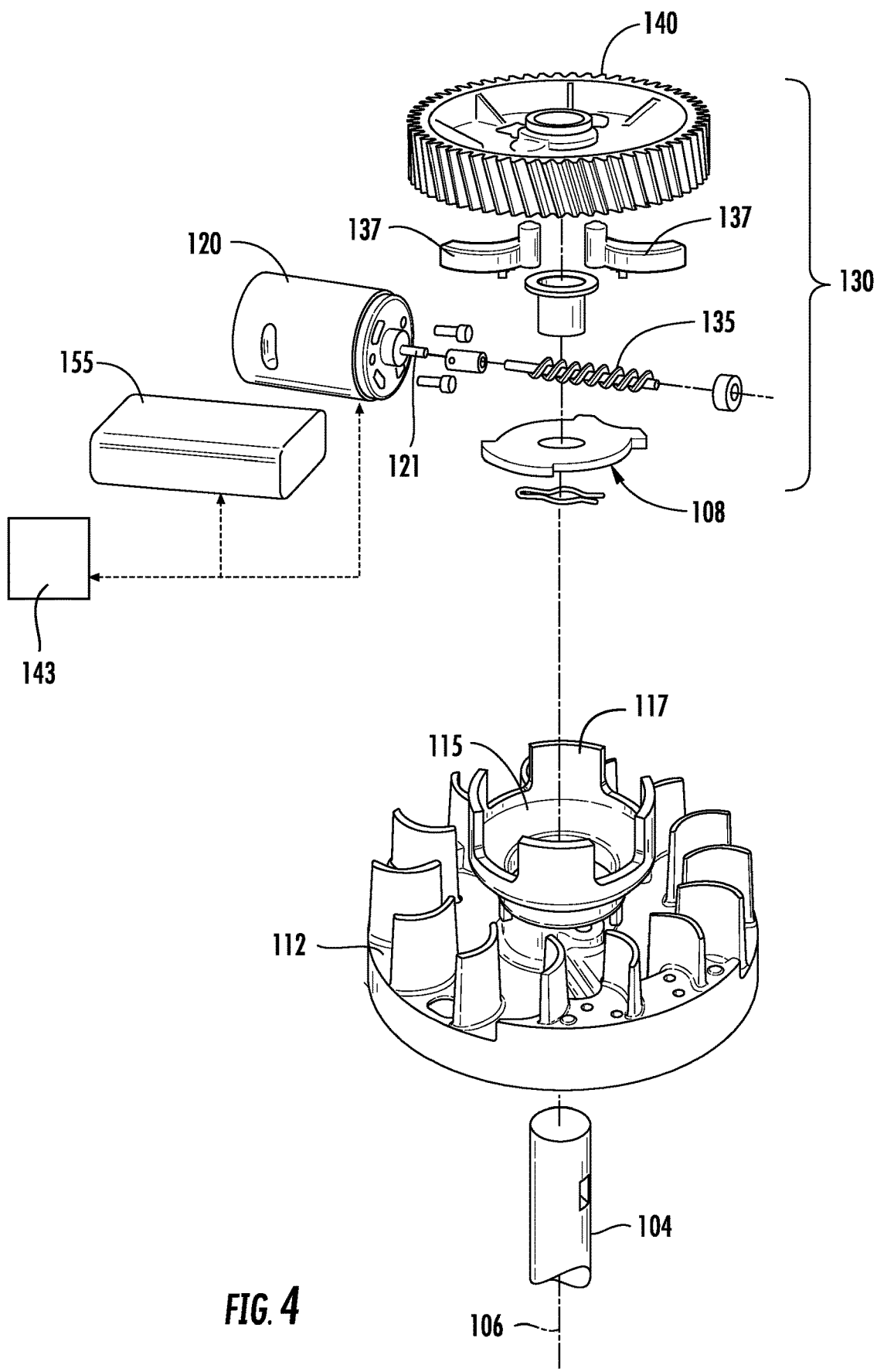
FIG. 4 is an exploded view of several components the engine of FIG. 1.

Referring to FIGS. 2 and 4, the electric starting system 110 includes an electric motor 120, a transmission 130, and an energy storage device such as a battery 155 (e.g., a lithium-ion battery, a capacitor, multiple batteries or capacitors, or other suitable energy storage devices). The electric starting system 110 is located within the blower housing 105. The electric motor 120 is electrically coupled to the battery 155 to be powered by the battery 155. In one embodiment, the electric motor 120 is a 12 volt (V) electric motor. In another embodiment, the electric motor 120 is a 7.2 V electric motor. In other embodiments, the electric motor 120 may be otherwise rated. The battery 155 may include one or more battery cells (e.g., lithium-ion cells). In some embodiments, the battery 155 may be further configured to power other systems of the engine 100, such as an electronic control having control circuitry coupled to sensors or detectors integrated with the engine 100 (e.g., brake release, fuel-level detector, ignition-fouling detector, governor, vacuum sensors, pressure sensors, temperature sensors, etc.). When activated in a response to a user input (e.g., via a key switch, a push button, a bail start system, a trigger start system for a pressure washer, other automatic start system, etc.), the electric starting system 110 rotates the crankshaft 104 to enable starting of the engine 100.

Figure 6:
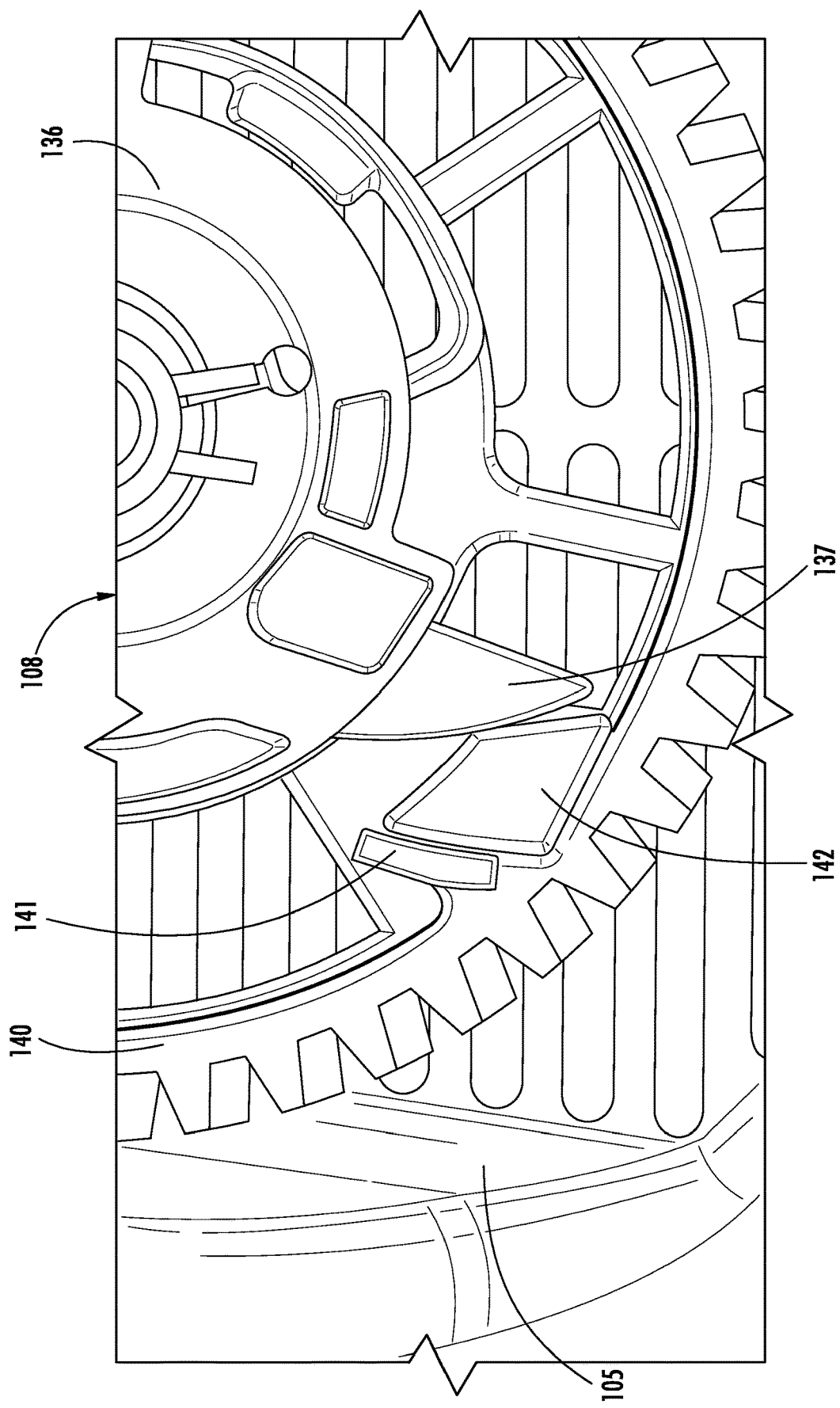
FIG. 6 is a perspective view of a portion of the engine of FIG. 1, according to an exemplary embodiment.

The transmission 130 includes a worm 135 coupled to the electric motor 120, a worm gear 140 engaged with the worm 135, a clutch 108, and a flywheel cup 115 of the flywheel 112 (see FIGS. 3 and 6). Referring to FIG. 3, the flywheel 112 is attached to the crankshaft 104 and includes the flywheel cup 115 with one or more flywheel protrusions 117. The flywheel cup 115 rotates with the flywheel 112. As such, the flywheel cup 115 and flywheel protrusions 117 rotate with the rotation of the crankshaft 104 about the crankshaft axis 106 upon rotation (e.g., cranking) of the engine 100. In some other embodiments, the flywheel 112 includes flywheel protrusions attached directly thereto without including the flywheel cup described above. Generally, the electric motor 120 turns the worm 135 and the worm gear 140 is then driven. The clutch 108 is coupled to the worm gear 140 and turns therewith. Engagement of the clutch 108 with the flywheel cup 115 (via dogs 137 described in more detail below) drives the flywheel 112 and causes the starting of the engine 100.

With continued reference to FIG. 2, the blower housing 105 includes an exterior wall 124 that defines an interior cavity 125. The interior cavity 125 is located on the bottom or underneath side of the blower housing 105 opposite the top side of the blower housing 105 that is visible during normal operation of the engine 100. The blower housing 105 also includes a carburetor debris cover 126 positioned adjacent the air filter assembly 107, an oil dipstick cutout 127 positioned adjacent the oil dipstick assembly 108, a fuel tank cutout 128 positioned adjacent the fuel tank 113, and a muffler cutout 129 positioned adjacent the muffler 111.

The engine 100 defines a cylinder axis A (see FIG. 3) along which the piston reciprocates in the cylinder, a front-to-back center plane B intersecting the cylinder axis A and the crankshaft axis 106, and a side-to-side center plane C arranged perpendicular to the front-to-back center plane B and intersecting the crankshaft axis 106. The front-to-back center plane B and the side-to-side center plane C separate four general quadrants, an air filter quadrant D broadly defined as a quadrant adjacent the air filter assembly 126, a fuel quadrant E broadly defined as a quadrant adjacent the fuel tank 113, an oil quadrant F broadly defined a quadrant adjacent the oil dipstick assembly 108, and an exhaust quadrant G broadly defined as a quadrant adjacent the muffler 111. In some embodiments, the air filter quadrant D and the fuel quadrant E are considered a cool half of the blower housing 105 because the muffler 111 is arranged on an opposite side of the cool half. In some embodiments, the fuel quadrant E and the oil quadrant F are considered a cool half because the muffler 111 is arranged on an opposite side of the cool half. In some embodiments, the electric motor 120 is positioned in a quadrant opposite the muffler 111. In some embodiments, the quadrants include different engine components. For example, the location of the oil dipstick assembly 108 and the fuel tank 113 may be switched.

A starter mount assembly in the form of a worm bracket 132 that captures the worm 135 and a motor bracket 133 that captures the electric motor 120. In some embodiments, the worm bracket 132 includes a bearing. In some embodiments, the worm bracket 132 is formed with the blower housing 105 or attached to the blower housing 105 (e.g., with fasteners or adhesive). The motor bracket 133 and the worm bracket 132 maintain the electric motor 120 in position within an interior cavity 125. One end of the worm 135 is coupled to the electric motor 120 and rotates about a worm axis 122. In some embodiments, positioning the motor bracket 133 and the worm bracket 132 away from the muffler 111 (e.g., in a cool quadrant or a cool half) increases the local structural characteristics of the plastic from which the blower housing 105 is formed. In some embodiments, the strength of the blower housing in the cool quadrant or cool half is higher than in other areas of the blower housing 105. In some embodiments, the cool quadrant or the cool half is defined relative to the piston 109 and not the muffler 111. In addition, the electric motor 120 may experience less vibration when located farther away from the cylinder 109 and reduced vibration can lead to increased longevity of the electric motor 120 and/or improved reliability and functionality. Further, the relatively lower heat in the mounting position of the electric motor 120 improves the ability of the electric motor 120 to function and the longevity of wiring and electrical components.

The battery 155 is attached (e.g., with fasteners or adhesive) to the blower housing 105 within the interior cavity 125. In some embodiments, the battery 155 is retained within a battery housing 156 fastened to the blower housing 105 with tamper resistant fastener 157 to inhibit removal of the battery 155 by a user other than an approved technician. The battery 155 is integrated into the blower housing 105 so that the battery 155 is removed along with the blower housing 105 during maintenance or installation. In some embodiments, the battery 155 and/or the battery housing 156 are shaped to match an outside contour of the blower housing 105. In some embodiments, the battery 155 includes a charging connector that an end user can access to provide charge to the battery cells via a wall charger connected to grid power (e.g., 110 VAC).

In some embodiments, the battery 155 is positioned in the oil quadrant F adjacent the oil dipstick cutout 127. In some embodiments, the battery 155 is positioned in a cool quadrant or a cool half of the blower housing 105. In some embodiments, the battery 155 is structured to be serviceable by a maintenance technician but not intended to be serviced by an end user. The battery 155 can include replaceable cells received within recesses or pockets of the battery housing 156 so that the cells may be removed and replaced by the maintenance technician. In some embodiments, the battery 155 is located in a half of the blower housing 105 opposite the electric motor 120. In some embodiments, the battery 155 is located in a different quadrant than the electric motor 120, while both are arranged in a cool half of the blower housing 105. The electric motor 120 and the battery 155 are coupled to the blower housing 105 so that they are removed with the blower housing 105 for service.

In some embodiments, the cylinder 109 defines a front of the engine 100 and the battery 155 and the electric motor 120 are located toward a back half of the engine 100. In some embodiments, the back half of the engine 100 is defined on an opposite side of the side-by-side center plane C from the cylinder 109.

The worm gear 140 is configured to rotate about the crankshaft axis 106 and selectively drive the crankshaft 104 via dogs 137 and the clutch 108 (e.g., a starter clutch, a freewheeling clutch, an overrunning clutch, and overspeed clutch, etc.). The clutch 108 is coupled to worm gear 140. When the clutch 108 is engaged (in an engaged position) the worm gear 140 and the crankshaft 104 rotate together. When the clutch 108 is disengaged (in a disengaged position) the worm gear 140 and the crankshaft 104 are free to rotate independently of one another. The crankshaft axis 106 is perpendicular to the worm axis 122. In other embodiments, the worm axis 122 is otherwise angled relative to the crankshaft axis 106.

Figure 5:
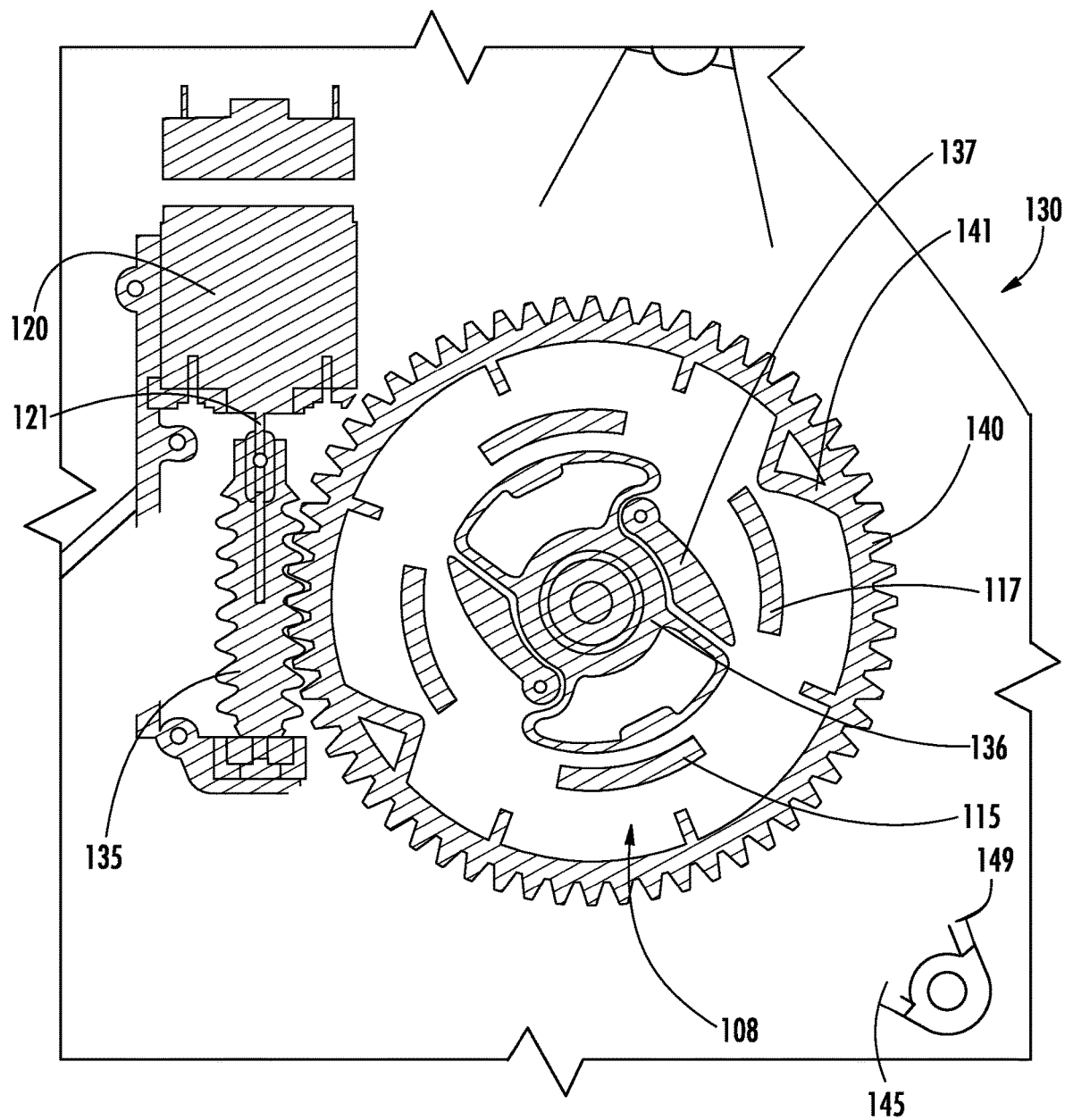
FIG. 5 is a section view of the engine of FIG. 4.

When cranking (e.g., a starting operation) is initiated by the user, the clutch 108 is engaged so that the worm gear 140 drives the crankshaft 104. Once the engine 100 has started, the clutch 108 disengages when the crankshaft 104 begins to rotate faster than the worm gear 140 (an overspeed condition), allowing the worm gear 140 to rotate independently of the crankshaft 104. In some embodiments, as illustrated in FIG. 4, the clutch 108 includes a pulley 136 and two dogs 137 movable relative to the pulley 136 between an extended or engaged position (shown in FIG. 2) and a retracted or disengaged position (shown in FIG. 5). The pulley 136 is coupled to and rotates with the worm gear 140.

When activated in a response to a user input, the electric starting system 110 rotates the crankshaft 104 to rotate (e.g., crank) the engine 100. The electric motor 120 rotates the worm 135. The worm 135 is coupled to the worm gear 140 and rotates the worm gear 140. The clutch 108 is engaged so the dogs 137 extend outward (e.g., fly out) from the crankshaft axis 106. The dogs 137 engage with the flywheel 112 via the flywheel protrusions 117 and rotate the crankshaft 104 to rotate (e.g., crank) the engine 100. The worm gear 140 includes one or more protrusions in the form of a pawl stop 141 (e.g., one for each dog 137) configured to limit the range of travel of the dogs 137 upon cranking of the engine 100. When the crankshaft 104 begins to rotate faster than the worm gear 140 (an overspeed condition), the dogs 137 are retracted by contact with (e.g., pushed inward toward a retracted position by) the flywheel protrusions 117.

Accordingly, the worm gear 140 is then allowed to rotate independently from the crankshaft 104. The electric motor 120 is turned off and rotation of the worm 135 and the worm gear 140 stops. The electric motor 120 may be turned off automatically in response to the engine reaching a threshold speed (e.g., as determined by monitoring the ignition system or spark plug), in response to the user removing the start input (e.g., stops turning the key switch or pushing the start button), after a set period of cranking time (e.g., 5 seconds), etc. Accordingly, an engine speed sensor and/or timer may be included. The engine speed sensor determines the engine speed based on signals from the crankshaft position, ignition system, etc. The timer (e.g., timing circuit) monitors the lapsed time from the start of engine cranking. In response to these signals, the electric motor 120 may be turned off automatically.

The worm 135 and the worm gear 140 are configured to rotate the crankshaft 104 at a lower speed than the rotational speed of the electric motor 120 and thereby produce higher torque at the crankshaft 104 than at the electric motor 120. Compared to conventional starter motors mounted to the engine block, this permits the use of a higher-speed, lighter, and more compact electric motor 120, while still producing sufficient torque at the crankshaft 104 to rotate (e.g., crank) the engine 100. For example, the electric motor 120 may be a high-speed motor rated for operation at 12,000 revolutions per minute (rpm) and the worm 135 and worm gear 140 reduce that rotational speed by a gear reduction ratio of 30:1 comparing the rotational speed of the electric motor 120 to the rotational speed of the crankshaft 104, with a resulting rotational speed of the crankshaft 104 of approximately 400 rpm. As another example, the gear reduction ratio may be 45:1, with a resulting gear speed of approximately 267 rpm. In some embodiments, the gear reduction ratio is between 30:1 and 50:1.

The engine 100 may also include a charging system to charge the battery 155. In some embodiments, the charging system includes an alternator to produce electricity. The alternator may be driven directly or indirectly (e.g., by a transmission, belt, chain, etc.) by the crankshaft 104. In other embodiments, other types of charging systems may be used. For example, an ignition coil waste spark charging system may be used in which waste sparks from the ignition coil are harvested to provide charging energy. In some embodiments excess energy from the ignition system is harvested to charge the battery 155. In a magneto or spark ignition system extra energy in the form of ignition sparks or pulses can be harvested and stored in the battery 155. Though a spark-based ignition system is discussed as an example other types of ignition systems are possible. The excess energy of the ignition system may also be sufficient to power the controller or other electrical components included in the engine. After the engine 100 is started, there is a relatively abundant amount of excess energy that can be harvested as electricity. For example, the energy from the two positive pulses or sparks of a four-cycle magneto ignition system can yield about one amp of current. Other types of ignition systems also provide waste energy that could be harvested to power an electronic governor system. In a four-cycle magneto ignition system there is a waste spark on the exhaust stroke of the cylinder. In such a system, the two positive pulses or sparks and the waste negative pulse or spark could all be harvested. As another example, a charge coil for a capacitor discharge ignition (CDI) system can be used as a charging system for the battery 155.

FIG. 6 illustrates a portion of electric starting system 110 according to an exemplary embodiment. In this embodiment, the worm gear 140 includes a damper 142 that is positioned between the pawl stop 141 of the worm gear 140 and the dog 137 of the clutch 108. The damper 142 is configured to soften the initial engagement of the dog 137 with the pawl stop 141 of the worm gear 140. In some embodiments, the damper 138 is made of an elastomer or rubber suitable able to slightly deform to dampen the initial engagement. In some embodiments, the dogs 137 are made of an elastomer or rubber. Without the damper 142, there may be a significant impact between the dogs and the pawl stops 141, causing a loud noise (e.g., a "thud" or "clunk") at initial engagement when the dogs 137 initially contact the pawl stops 141 of the worm gear 140. This type of contact may result in wear or breakage of the worm gear 140, the clutch 108, and/or the worm 135. Though only one damper 142 is illustrated a second damper is similarly positioned between the protrusion and dog that are not shown. In some embodiments, more than two dampers may be included with the electric starting system 110.

In some embodiments, the electric starting system 110 further includes a controller 143 (FIG. 4) configured to control operation of the electric starting system 110. The controller 143 may be separate from or incorporated into a multi-purpose engine controller (e.g., an ECU). In some embodiments, the controller 143 includes hard-wired circuitry, but not a computer processing unit. In other embodiments, the controller 143 does include a processor. In some embodiments, the controller 143 is part of the battery 155 and is located within the battery housing. The controller 143 may be configured to control operation of the electric motor 120. For example, in addition to or in place of the dampers 142 described above, the controller 143 may control the electric motor 120 to perform a first soft start in which the force applied during initial engagement of the dogs 137 and the protrusions is reduced by increasing the rotational speed of the electric motor 120 over time. When the electric motor 120 first begins to rotate it does so at a relatively slow speed so that a relatively small force is applied during initial engagement. In some embodiments, the relatively slow speed is maintained for a time of about four-hundred-fifty milliseconds (450 ms). The controller 143 then increases this relatively slow speed until the electric motor is operating at its full rated speed. In some embodiments, the controller 143 uses pulse width modulation (e.g., via an electronic control) to control the power supplied to the electric motor 120 and thereby vary the rotational speed of the electric motor 120.

Alternatively, or in addition to the first soft start, the controller 143 can be arranged in communication with a load sensor coupled to or arranged to monitor the electric motor 120. In some embodiments, the load sensor is a current sensor arranged to sense current consumed by the electric motor 120 and provide a signal indicative of the consumed current to the controller 143. The controller 143 controls the electric motor 120 so that the worm 135 rotates at a relatively slow speed while the current consumption of the electric motor 120 is constant. In some embodiments, the relatively slow speed is maintained while the current draw is below an engagement threshold or within an engagement range of current draws. When the controller 143 recognizes a spike or a significant increase in current draw by the electric motor 120 (e.g., the engagement threshold current is exceeded), then the speed of the electric motor 120 is increased until the electric motor is operating at its full rated speed.

The construction and arrangements of the starter system for an engine, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. While certain combinations of features and methods of operation are recited in the claims, other combinations of features and method steps are contemplated. This disclosure is intended to provide support for all combinations of features explicitly recited and not explicitly recited.

What is claimed is:

1. An engine, comprising:
a controller configured to:
control a current provided by a battery mounted in a blower housing of the engine to an electric starter motor mounted to the blower housing to cause the electric starter motor to rotate at a first speed,
sense a current draw of the electric starter motor,
continue operation of the electric starter motor at the first speed while the current draw is below a threshold value,
determine that the current draw has exceeded the threshold value, and
increase the speed of the electric starter motor to a second speed greater than the first speed in response to determining that the current draw has exceeded the threshold value.

2. The engine of claim 1, wherein the controller maintains the first speed for at least four-hundred-fifty milliseconds.

3. The engine of claim 1, wherein the controller is further configured to discontinue current provided from the battery to the electric starter motor in response to determining that a threshold engine speed has been reached.

4. The engine of claim 1, wherein the controller uses pulse width modulation to power the electric starter motor.

5. The engine of claim 1, wherein the controller increases the speed of the electric starter motor from the first speed to the second speed using a gradual speed increase.

6. The engine of claim 1, wherein the controller controls selective charging of the battery.

* * * * *